United States Patent
Byers et al.

(10) Patent No.: US 8,914,538 B2
(45) Date of Patent: Dec. 16, 2014

(54) IMPLEMENTING NETWORK MANAGER QUARANTINE MODE

(75) Inventors: Marcy E. Byers, Rochester, MN (US); Kenneth M. Valk, Rochester, MN (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 799 days.

(21) Appl. No.: 12/779,076

(22) Filed: May 13, 2010

(65) Prior Publication Data

US 2011/0283028 A1    Nov. 17, 2011

(51) Int. Cl.
G06F 15/16    (2006.01)
G06F 13/40    (2006.01)

(52) U.S. Cl.
CPC ................... *G06F 13/4022* (2013.01)
USPC .......................................... 709/237

(58) Field of Classification Search
CPC ................................ G06F 13/4022
USPC .......................................... 709/237
See application file for complete search history.

(56) References Cited

U.S. PATENT DOCUMENTS

| | | | | |
|---|---|---|---|---|
| 5,822,512 A * | 10/1998 | Goodrum et al. | ............... | 714/13 |
| 6,229,538 B1 * | 5/2001 | McIntyre et al. | ............. | 715/734 |
| 6,295,585 B1 * | 9/2001 | Gillett et al. | ................... | 711/148 |
| 7,388,869 B2 * | 6/2008 | Butehorn et al. | ............. | 370/401 |
| 7,996,511 B1 * | 8/2011 | Wiese et al. | .................... | 709/223 |
| 8,019,857 B2 * | 9/2011 | Nguyen | ......................... | 709/224 |
| 2002/0095489 A1 * | 7/2002 | Yamagami | ..................... | 709/224 |
| 2004/0132451 A1 * | 7/2004 | Butehorn et al. | ............. | 455/445 |
| 2005/0010715 A1 * | 1/2005 | Davies et al. | ................. | 711/100 |
| 2005/0021606 A1 * | 1/2005 | Davies et al. | ................. | 709/203 |
| 2005/0105524 A1 * | 5/2005 | Stevens et al. | ................ | 370/389 |
| 2006/0112297 A1 * | 5/2006 | Davidson | .......................... | 714/2 |
| 2007/0100964 A1 * | 5/2007 | Davies et al. | ................. | 709/217 |
| 2007/0282951 A1 * | 12/2007 | Selimis et al. | ................ | 709/205 |

\* cited by examiner

*Primary Examiner* — Rupal Dharia
*Assistant Examiner* — Marcus McKenzie
(74) *Attorney, Agent, or Firm* — Joan Pennington

(57) ABSTRACT

A method and circuit for implementing a network manager quarantine mode in an interconnect system, and a design structure on which the subject circuit resides are provided. A respective network manager on a source interconnect chip and a destination interconnect chip sends end-to-end (ETE) heartbeats on each path between the source and destination interconnect chips. Each network manager maintains a heartbeat table with counters to track each path to each destination interconnect chip. When a first network manager of a first interconnect chip detects a change from at least one valid path to no working paths for a second interconnect chip of the interconnect chips, the quarantine mode is established for a programmable quarantine time interval and all paths are prevented from advertising good heartbeats during the quarantine time interval.

24 Claims, 9 Drawing Sheets

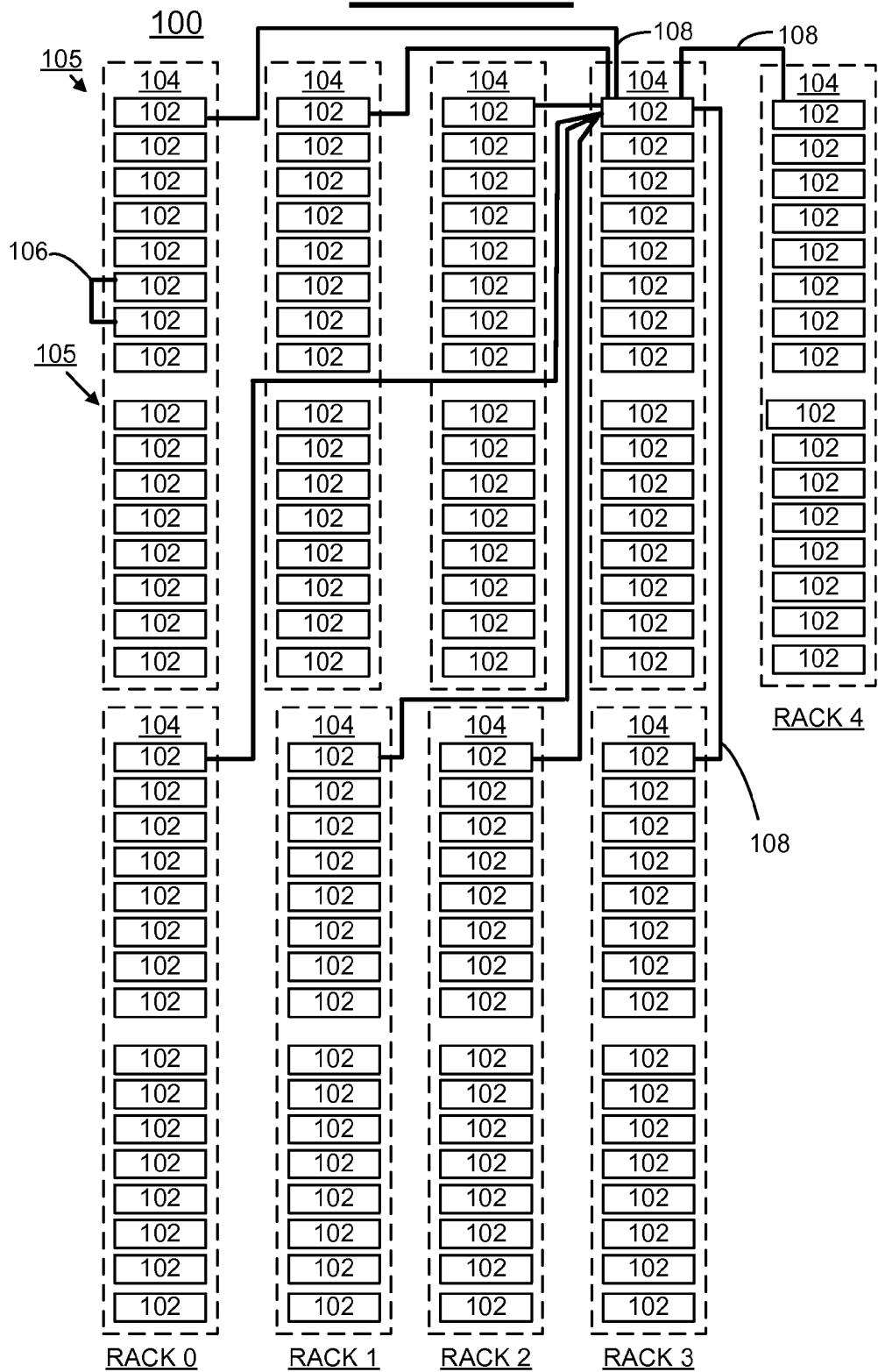

IMPLEMENTING NETWORK MANAGER QUARANTINE MODE

FIELD OF THE INVENTION

The present invention relates generally to the data processing field, and more particularly, relates to a method and circuit for implementing a network manager quarantine mode in a local rack interconnect system, and a design structure on which the subject circuit resides.

DESCRIPTION OF THE RELATED ART

It is desirable to replace multiple interconnects, such as Ethernet, Peripheral Component Interconnect Express (PCIe), and Fibre channel, within a data center by providing one local rack interconnect system. The local rack interconnect system is used to transfer packets from a source high bandwidth device, such as either a central processor unit (CPU) or an input/output (I/O) adapter, to a destination high bandwidth device, for example, either a CPU or I/O adapter, using one or more hops across lower bandwidth links in the interconnect system.

When building an interconnect system or network generally it is an advantage to build the network interconnect system as a multiple path network interconnect system, where traffic from a particular source to a particular destination takes many paths through the network interconnect system, verses building the network interconnect system as a single-path, where all packets from a particular source to a particular destination all take the same path through the network interconnect system.

In the multiple path local rack interconnect system, one node can go down for various reasons so there is a need for a mechanism to be in place to alert the other nodes and reroute traffic. Since there are multiple data paths in each interconnect chip, keeping track of the valid, working paths is a significant task. If one side of a link goes down there needs to be a way to also bring down the other side so that it does not keep attempting to send traffic across a non-working node.

A need exists for an effective method and circuit to implement a network manager quarantine mode in a local rack interconnect system. It is desirable to provide such method and circuit that effectively and efficiently tracks multiple valid and working data paths between a plurality of source and destination devices in the interconnect system.

SUMMARY OF THE INVENTION

Principal aspects of the present invention are to provide a method and circuit for implementing a network manager quarantine mode in an interconnect system, and a design structure on which the subject circuit resides. Other important aspects of the present invention are to provide such method, circuitry, and design structure substantially without negative effect and that overcome many of the disadvantages of prior art arrangements.

In brief, a method and circuit for implementing a network manager quarantine mode in an interconnect system, and a design structure on which the subject circuit resides are provided. A respective network manager on a source interconnect chip and a destination interconnect chip sends end-to-end (ETE) heartbeats on each path between the source interconnect chip and the destination interconnect chip. Each network manager maintains a heartbeat table with counters to track each path to each destination interconnect chip. When a first network manager of a first interconnect chip detects a change from at least one valid path to no working paths for a second interconnect chip of the interconnect chips, the quarantine mode is established for a programmable quarantine time interval and all paths are prevented from advertising good heartbeats during the quarantine time interval.

In accordance with features of the invention, when the quarantine mode is established the first network manager of the first interconnect chip prevents all outgoing heartbeats from advertising good heartbeats for the second interconnect chip until the quarantine time interval expires and all path updates to the transport layers are forced to zero or advertised as bad until the quarantine time interval expires. The network manager on the second interconnect chip declares all paths lost to first interconnect chip during the quarantine time interval in response to the quarantine mode of the first network manager.

In accordance with features of the invention, a quarantine timer is started for the established quarantine mode of the first network manager. The quarantine timer causes the first network manager to continue advertising bad heartbeats during the quarantine time interval.

In accordance with features of the invention, once the programmable quarantine time interval expires, the paths can be declared working again when the network manager on both chips validates the paths. The network manager provides a transport layer with a set of working paths or a spray mask including multiple available links for each destination chip for spraying packets across multiple links of a local rack interconnect system. The network manager provides an update to the transport layer when a status change is detected.

In accordance with features of the invention, the spray mask includes multiple paths that include some links providing a direct connection between the source chip and the destination chip. Some links cause the packet to be sent to one or more intermediate interconnect chips or hops before reaching the destination chip. Each path is identified, for example, by a chip-ID, exit port of a destination interconnect chip.

In accordance with features of the invention, the heartbeat table includes an up/down counter for each chip-ID, exit port; an enable bit to control whether or not to send heartbeats for this chip-ID, exit port; a heartbeat return bit from the last heartbeat received for this chip-ID, exit port; a previous status bit indicating previously reported status of the heartbeat for this chip-ID, exit port; and a hop count field identifying a hop count of the last received heartbeat for this chip-ID, exit port. The heartbeat return status combines both the counter value of the up/down counter for this chip-ID, exit port and the last heartbeat received for this chip-ID, exit port. The heartbeat return status advertises good when the network manager on both the source chip and the destination chip validates a path after the quarantine timer expires.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A, 1B, 1C, 1D, and 1E are respective schematic and block diagrams illustrating an exemplary a local rack interconnect system for implementing a network manager quarantine mode in accordance with the preferred embodiment;

DETAILED DESCRIPTION OF THE PREFERRED EMBODIMENTS

Figure 1B:
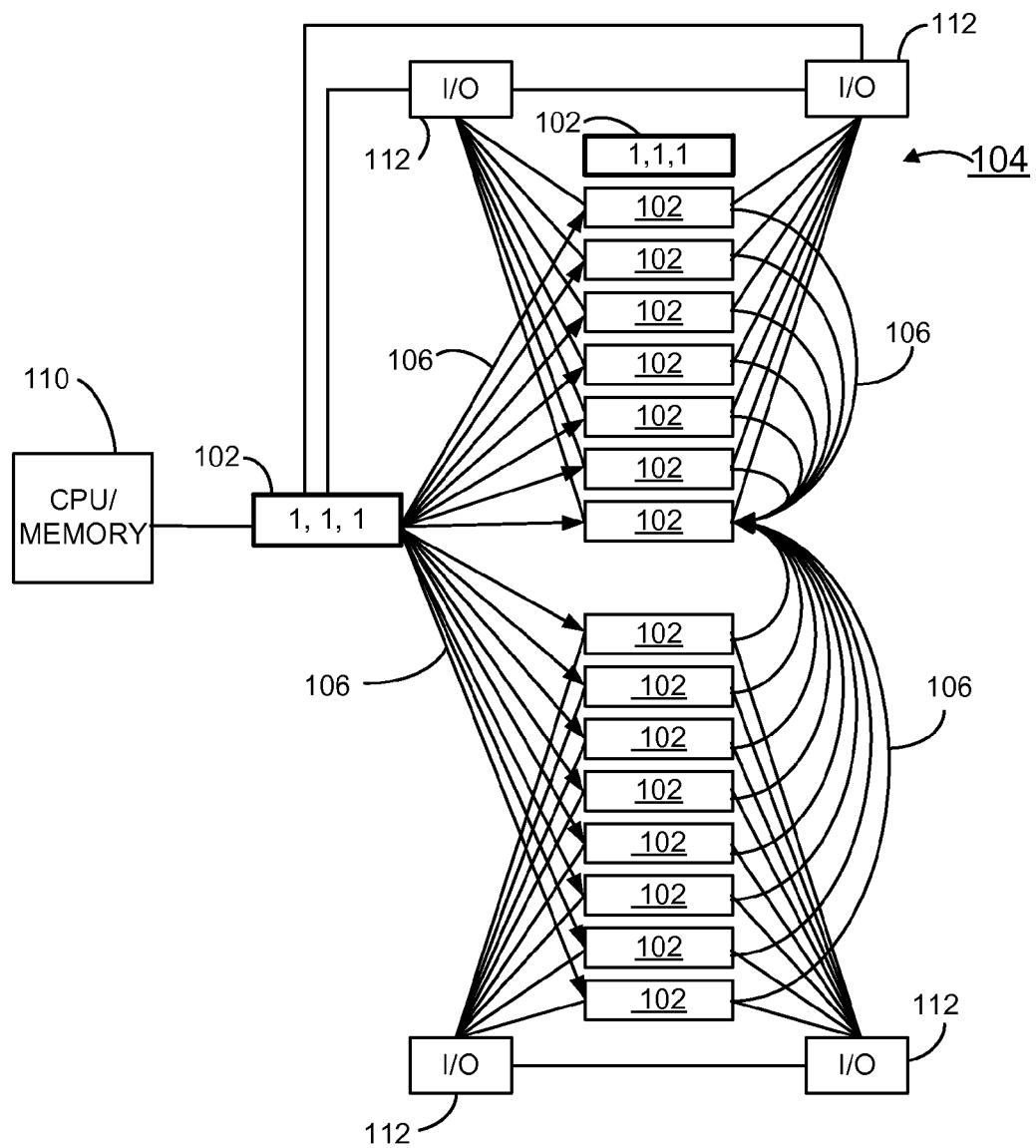

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing a network manager quarantine mode in an interconnect system.

Having reference now to the drawings, in FIG. 1A, there is shown an example multiple-path local rack interconnect system generally designated by the reference character 100 used for implementing a network manager quarantine mode in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (x2) high-speed serial (HSS) link.

Figure 1C:
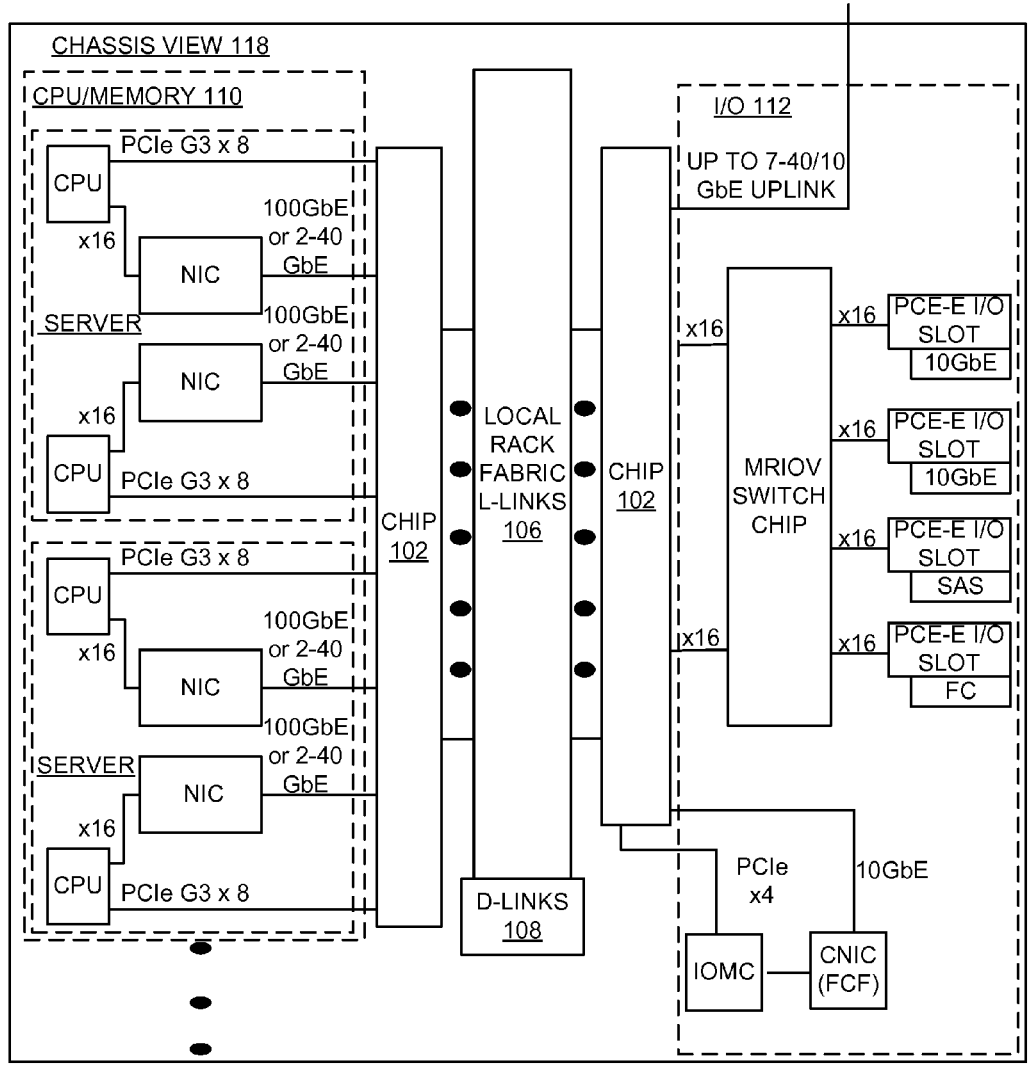
Figure 1D:
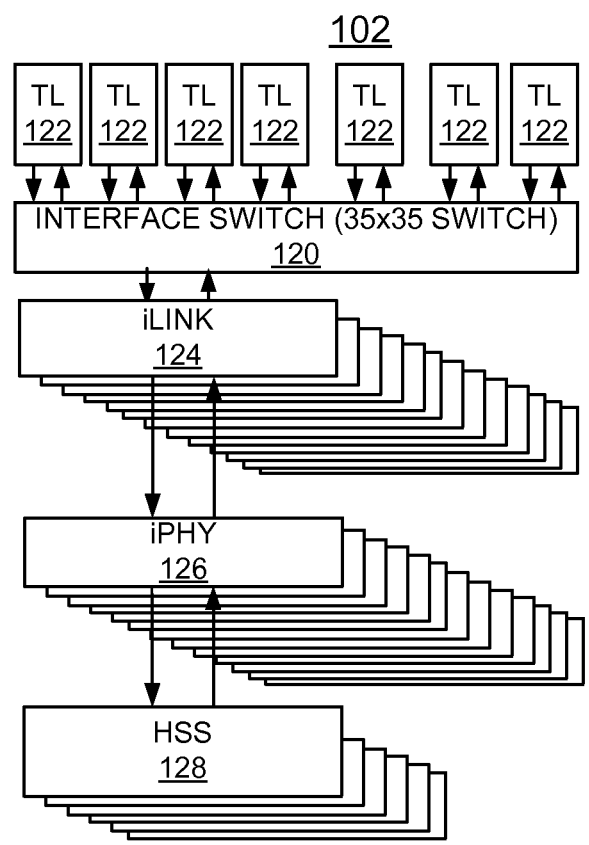
Figure 1E:
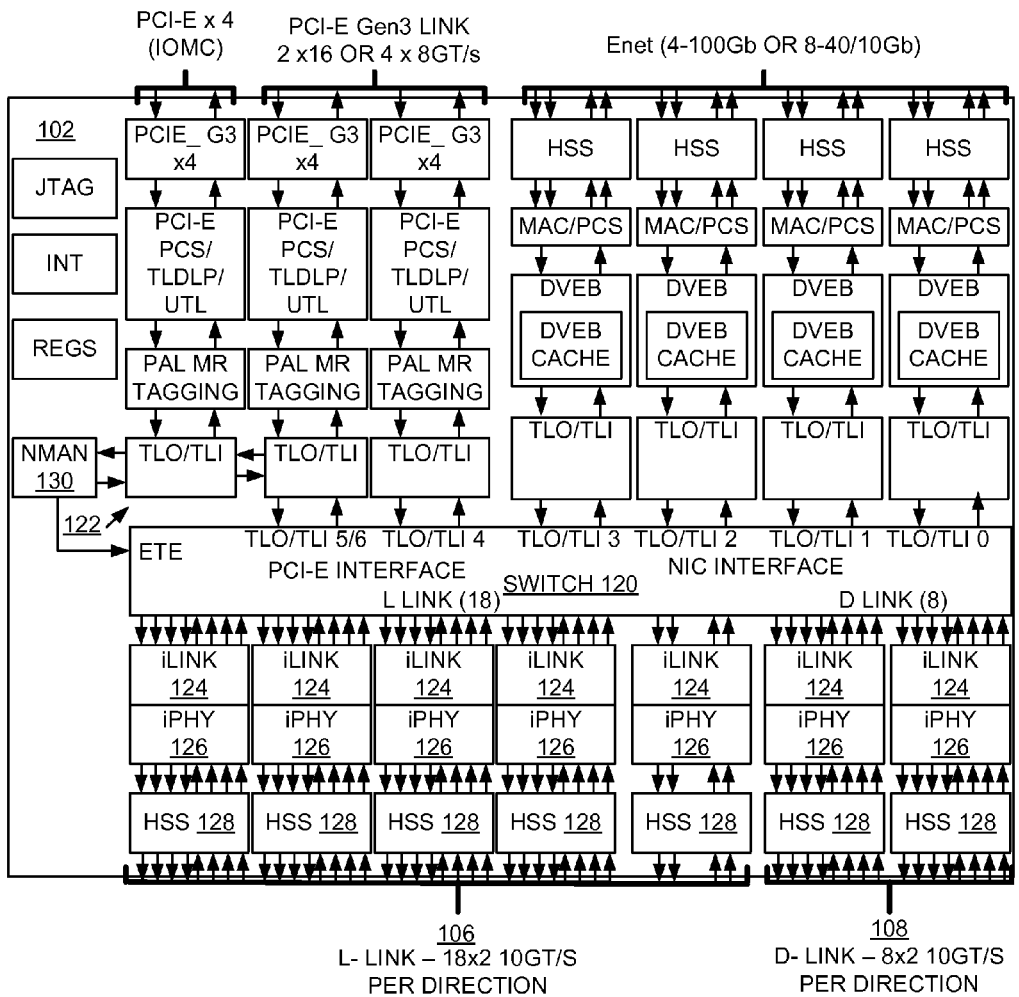

Referring also to FIG. 1E, each of the interconnect chips 102 of FIG. 1A includes, for example, 18 L-links 106, labeled 18 x2 10 GT/S PER DIRECTION and 8 D-links 108, labeled 8 x2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 x8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 x 16 to an external MRIOV switch chip, with four x16 to PCI-E I/O Slots with two Ethernet slots indicated 10 GbE, and two storage slots indicated as SAS (serial attached SCSI) and FC (fibre channel), a PCIe x4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 x8 full duplex cores providing the illustrated 26 x2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E x4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 x4, and PCIE_G3 2x8, PCIE_G3 2x8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a method and circuit for implementing a network manager quarantine mode in an interconnect system, and a design structure on which the subject circuit resides are provided. A network manager 130 on the interconnect chip 102 sends end-to-end (ETE) heartbeats that are used to track valid and best paths. The quarantine mode is established by a first network manager 130 of the first interconnect chip 102 when a change is detected from at least one working path to all paths are lost to a second interconnect chip 102. The network manager 130 on the second interconnect chip 102 then declares all paths lost to first interconnect chip 102 during the quarantine time interval in response to the quarantine mode of the first network manager 130.

In accordance with features of the invention, when the quarantine mode is established, the first network manager 130 of the first interconnect chip 102 prevents all outgoing heartbeats from advertising good heartbeats for the second interconnect chip 102 until the quarantine time interval expires. Also all path updates to the transport layers 122 are forced to zero until the quarantine time interval expires.

In accordance with features of the invention, a quarantine timer is started for the established quarantine mode of the first network manager 130. The quarantine timer causes the first network manager 130 to continue advertising bad heartbeats during the quarantine time interval.

Figure 2:
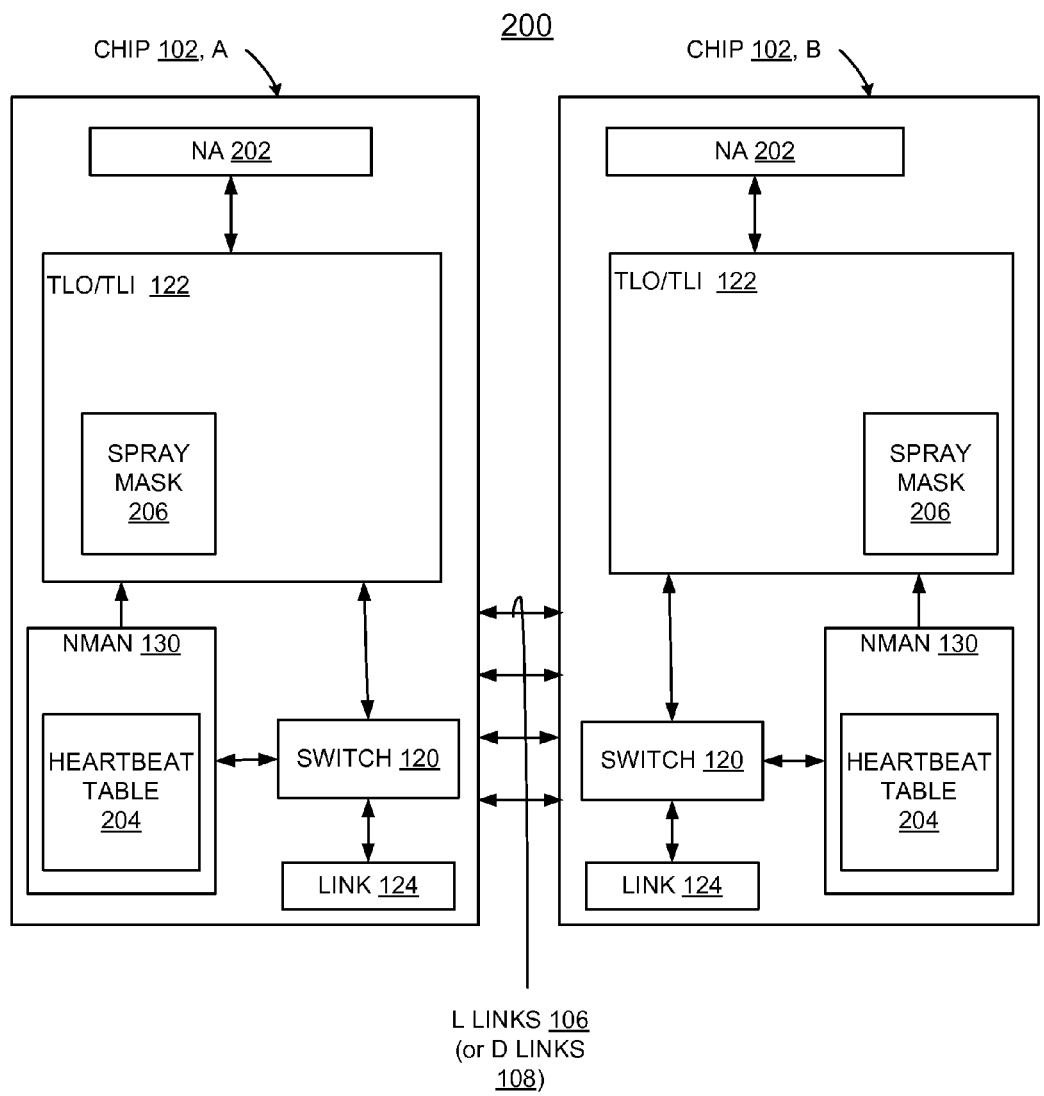
FIG. 2 is a schematic and block diagram illustrating a circuit for implementing a network manager quarantine mode in accordance with the preferred embodiment.

Referring now to FIG. 2, there is shown a circuit generally designated by the reference character 200 for implementing a network manager quarantine mode in the interconnect system 100 in accordance with the preferred embodiment. Circuit 200 and the interconnect chip 102 includes a respective Network Adapter (NA) 202, as shown included in an illustrated pair of interconnect chips 102 of a first interconnect chip 102, A and a second interconnect chip 102, B. Circuit 200 and each interconnect chip 102 includes a transport layer 122 including a respective transport layer out (TLO), and a respective transport layer in (TLI) as shown in FIG. 2.

Circuit 200 and each interconnect chip 102 includes a network manager (NMan) 130 that maintains a heartbeat table 204 in accordance with the preferred embodiment. Each network manager 130 maintains the heartbeat table 204 which includes counters to track each path through the interconnect system 100 to each destination interconnect chip 102. The heartbeat table 204 includes predefined fields for each path used in monitoring all paths through the network to all of the multiple destination interconnect chips 102 or chip Ids. The transport layer 122 includes a spray mask 206 received from the network manager (NMan) 130 in accordance with the preferred embodiment.

In accordance with features of the invention, the network manager or NMan 130 uses End-to-End (ETE) heartbeats for identifying available, valid links by sending ETE heartbeats across local links 106, 108 in the interconnect system 100. For example, the NMan 130 of each interconnect chip 102 maintains the spray mask 208 including every other interconnect chip in the interconnect system 100 by sending End-to-End (ETE) heartbeats across all local L-links 106 and D-links 108 to all destination interconnect chips 102. When the NMan 130 of a first interconnect chip 102 is receiving good heartbeats from the NMan 130 of another interconnect chip 102 on one of its links, the NMan 130 of the first interconnect chip 102 receives a predefined number of good heartbeats and sets the corresponding link bit in the spray mask 206 for that other interconnect chip 102. The NMan 130 forwards a set of working paths defined by the spray mask 206 to the TLs 122. The spray mask 206 is then forwarded to an interconnect switch 120 which uses the spray mask 206 to decide where to spray packets from a source device to a destination device. Circuit 200 includes the interface switch 120 connecting a plurality of transport layers (TL) 122, such as 7 TLs, and interface links (iLink) layer 124 of the interconnect chips 102 including the illustrated interconnect chip 102, A and the interconnect chip 102, B that are connected together by multiple local L-links 106 or D-links 108, and L-links 106.

To sustain the high bandwidth of the source and destination devices, packets are sprayed across multiple paths of L links 106, or L links 106 and D links 108 of the multiple-path local rack interconnect system 100 using the spray mask 206 to select paths. Some of the multiple L links 106, or multiple L links 106 and D links 108 provide a direct connection between the source interconnect chip 102 and the destination interconnect chip 102. Some of the multiple L links 106 or multiple L links 106 and D links 108 cause the packet to be sent to one or more intermediate interconnect chips 102 before reaching the destination interconnect chip 102.

In accordance with features of the invention, the heartbeat table 204 tracks each valid and best working path through the interconnect system 100. Each path is identified, for example, by a chip-ID, exit port. The heartbeat table 204 includes an up/down counter for each chip-ID, exit port, such as a 7-bit counter where count values 0-63 represent a bad heartbeat, and 64-127 represents a good heartbeat. Each counter of the heartbeat table 204 is incremented with a heartbeat is received from the chip-ID, exit port of the destination interconnect chip 102. Each counter of the heartbeat table 204 is decremented on a set interval. For example, to detect a broken path in 32 ms, in order to decay from a count value of 126 indicating a good path to a count value of 63 for a bad path, the counter of the heartbeat table 204 receives 64 decrement ticks in 32 ms, for a set decrement interval of 32 ms/64 or 500 µs or every 250,000 cycles. In order to maintain a good heartbeat count with some dropped ETE heartbeats, the heartbeats are transmitted, for example, at twice the rate of the decrement interval or every 250 µs or every 125,000 cycles to increment the counter when the heartbeat is received for each chip ID, exit port.

In accordance with features of the invention, the heartbeat table 204 includes together with the up/down counter for each chip-ID, exit port, an enable bit to control whether or not to send heartbeats for this chip-ID, exit port; a heartbeat return bit from the last heartbeat received for this chip-ID, exit port; a previous status bit indicating previously reported status of the heartbeat for this chip-ID, exit port; and a two-bit hop count field identifying hop count of the last received heartbeat for this chip-ID, exit port. The heartbeat return bit is good only when both the counter value of the up/down counter for this chip-ID, exit port and the last heartbeat received for this chip-ID, exit port are good.

In operation of circuit 200 accordance with features of the invention, when a first network manager 130 of a first interconnect chip 102, such as chip 102, A detects a change from at least one valid path to no working paths for a second interconnect chip 102, such as chip 102, B, the quarantine mode is established for a programmable quarantine time interval. While in the quarantine mode the network manager 130 on the first interconnect chip 102, A forces all outgoing heartbeats for the second interconnect chip 102, B and all path updates to TLs for the second interconnect chip 102, B to zero or bad. The network manager 130 on the second interconnect chip 102, B then will declare all paths lost to first interconnect chip 102, A during the quarantine time interval in response to the quarantine mode established by the first network manager 130 on the first interconnect chip 102, A.

In accordance with features of the invention, once the programmable quarantine time interval expires, paths can be declared working again when the network manager 130 on both chips 102 validates any of the paths. The network manager 130 provides updates to the transport layer 122 and the spray mask 206 including updated multiple available links for each destination chip 102 for spraying packets across multiple links of a local rack interconnect system 100.

The spray mask 206 is updated with the network manager 130 providing an update to the transport layer 122 when a status change is detected, for example, updating any paths that are indicated as good following the quarantine time interval. The spray mask 206 includes some links providing a direct connection between the source chip and the destination chip. Some paths or links cause a packet to be sent to one or more intermediate interconnect chips 102 or hops before reaching the destination chip 102.

Figure 3:
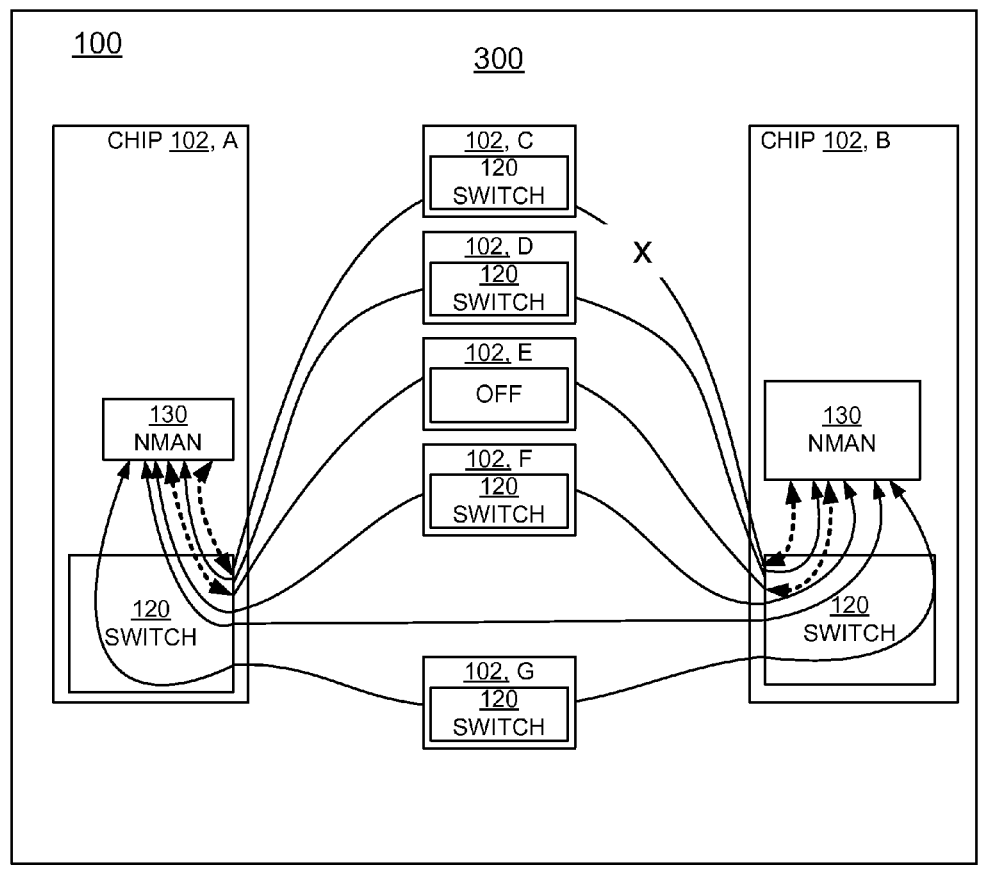
FIGS. 3 and 4 illustrate exemplary operations performed by the circuit of FIG. 2 for implementing a network manager quarantine mode in accordance with the preferred embodiment.

Referring now to FIG. 3, there are shown exemplary operations generally designated by the reference character 300 performed by the circuit 200 for implementing network manager heartbeat operations used for a quarantine mode in the interconnect system 100 in accordance with the preferred embodiment. Heartbeats are sent over multiple paths between the NMan 130 of a first chip 102, A, and the NMan 130 of a second chip 102, B. Multiple paths are indicated by bi-directional lines extend between the first chip 102, A, and a second chip 102, B through a plurality of intermediate chips 102, C, D, E, F, and G. The NMan 130 of a first chip 102, A, and the NMan 130 of a second chip 102, B send the ETE heartbeats to determine which potential paths to the destination chip are actually up and working.

As shown in FIG. 3, one of the intermediate chips 102, E is powered off and one of the links between the intermediate chip 102, C is broken. Dotted bi-directional lines between both the NMan 130 of a first chip 102, A, and the NMan 130 of a second chip 102, B indicate broken paths which are not working. Heartbeats sent by the respective NMan 130 on the broken paths are not received from this chip ID, exit port and the heartbeat up/down counter is decremented without being incremented so that the count value decreases and indicates the broken path. When the respective NMan 130 detects a status change on one or more paths for a particular chip ID, it broadcasts a path status change to all TLs in the interconnect chip 102 of the NMan including the chip ID of the destination chip 102 for this path update, a good port field indicating whether each exit port has a good path to the destination chip ID, a best port field indicating which paths in the good port field have the lowest hop count and a best port 1 hop bit indicating paths in the best port field that are 1-hop paths.

When a destination chip ID goes from one or more working paths to no paths work, the network manager 130 starts the quarantine mode in accordance with the present invention.

Figure 4:
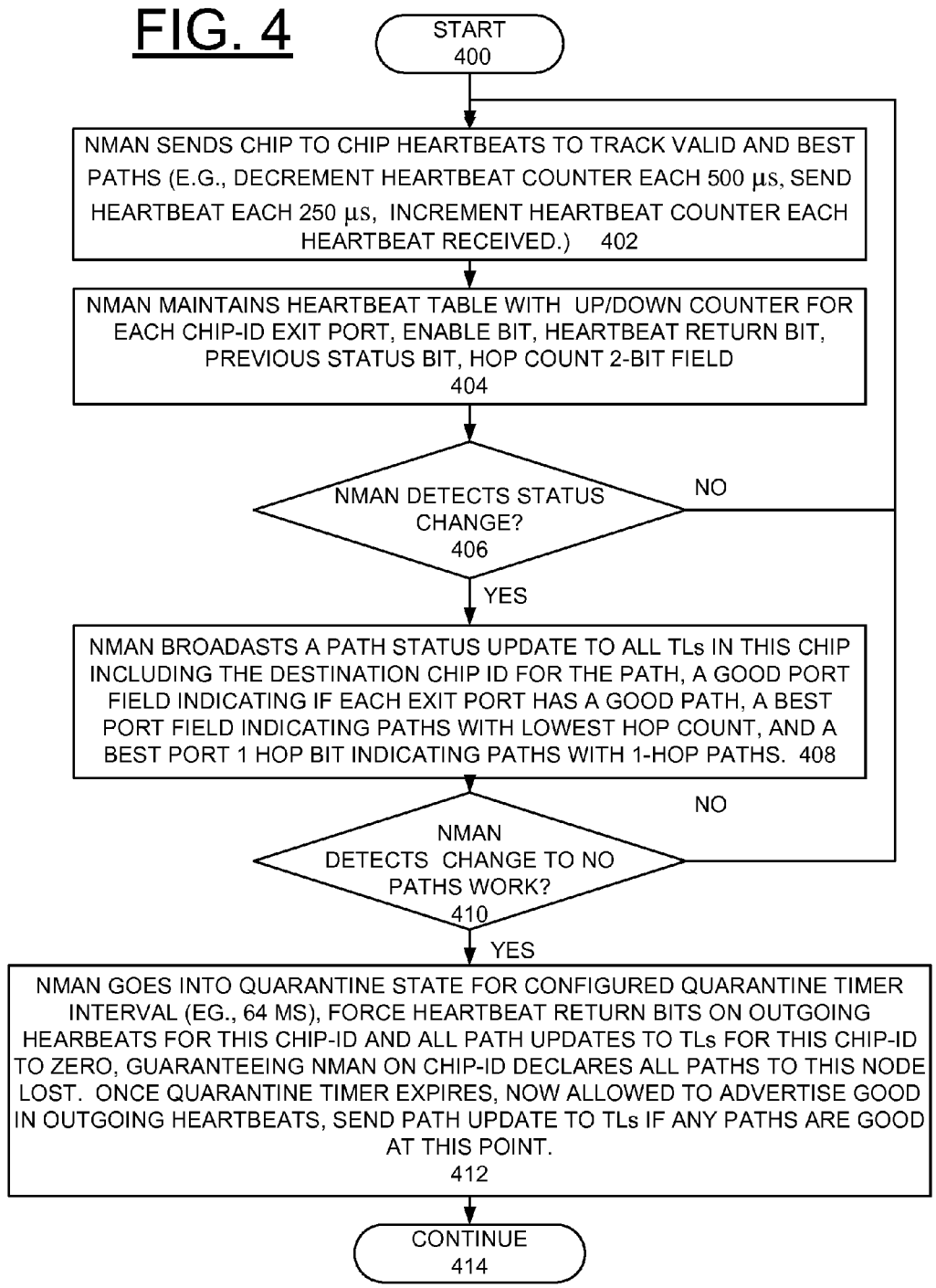

Referring now to FIG. 4, there are shown exemplary operations performed by the circuit 200 for implementing a network manager quarantine mode in accordance with the preferred embodiment starting at a block 400. As indicated at a block 402, the network manager 130 on the interconnect chip 102 sends end-to-end (ETE) heartbeats that are used to track valid and best paths. For example, the NMan decrements the heartbeat counter on a set decrement tick, such as every 500 µs or every 250,000 cycles and increment the counter when each heartbeat is received for each chip ID, exit port at block 402. The network manager 130 sends the ETE heartbeats at a higher rate, such as twice the rate of the set decrement tick, such as every 250 µs or every 125,000 cycles. A count value of greater than or equal to 64 with a heartbeat return bit of one indicates a good path between source and destination interconnect chips 102.

As indicated at a block 404, the network manager 130 maintains the heartbeat table 204, which includes decrementing and incrementing the heartbeat counter for each chip ID, exit port, together with setting the enable bit, heartbeat return bit, previous status bit, and hop count 2-bit field for each path for the destination chip ID.

As indicated at a decision block 406, the network manager 130 checks for a path status change. When a status change is not identified, then the heartbeat operations continue returning to block 402. When a path status change is identified, then the network manager 130 broadcasts the path status change to all TLs in the interconnect chip 102 of the NMan including the chip ID of the destination chip 102 for this path update, a good port field indicating whether this exit port has a good path to the destination chip ID, a best port field indicating which paths in the good port field have the lowest hop count and a best port 1 hop bit indicating paths in the best port field are 1-hop paths, as indicated at a block 408.

As indicated at a decision block 410, the network manager 130 checks for a path status change from at least one working path to no paths work. When the change to no paths work is not identified, then the heartbeat operations continue returning to block 402. When a path status change to no paths work is identified, then the network manager 130 goes to the quarantine mode, as indicated at a block 412.

As indicated at a block 412, when the quarantine mode is established, a quarantine timer is started for the established quarantine mode of the first network manager 130. The quarantine timer causes the first network manager 130 to advertise bad heartbeats during the quarantine time interval. The first network manager 130 of the first interconnect chip 102 prevents all outgoing heartbeats from advertising good heartbeats for the second interconnect chip 102 until the quarantine time interval expires, and all path updates to the transport layers 122 are forced to zero until the quarantine time interval expires. This guarantees that the network manager 130 of the destination interconnect chip ID, also eventually declares all paths to this node are lost. Once the quarantine timer expires, the paths can be declared working again when the network manager 130 on both chips validates the paths. The network manager 130 provides a transport layer with a set of working paths or a spray mask including multiple available links for each destination chip for spraying packets across multiple links of the local rack interconnect system 100. The network manager 130 provides an update to each transport layer when a status change is detected if any paths are good at this point after the quarantine timer expires at block 412. Then the sequential operations continue at as indicated at a block 414.

Figure 5:
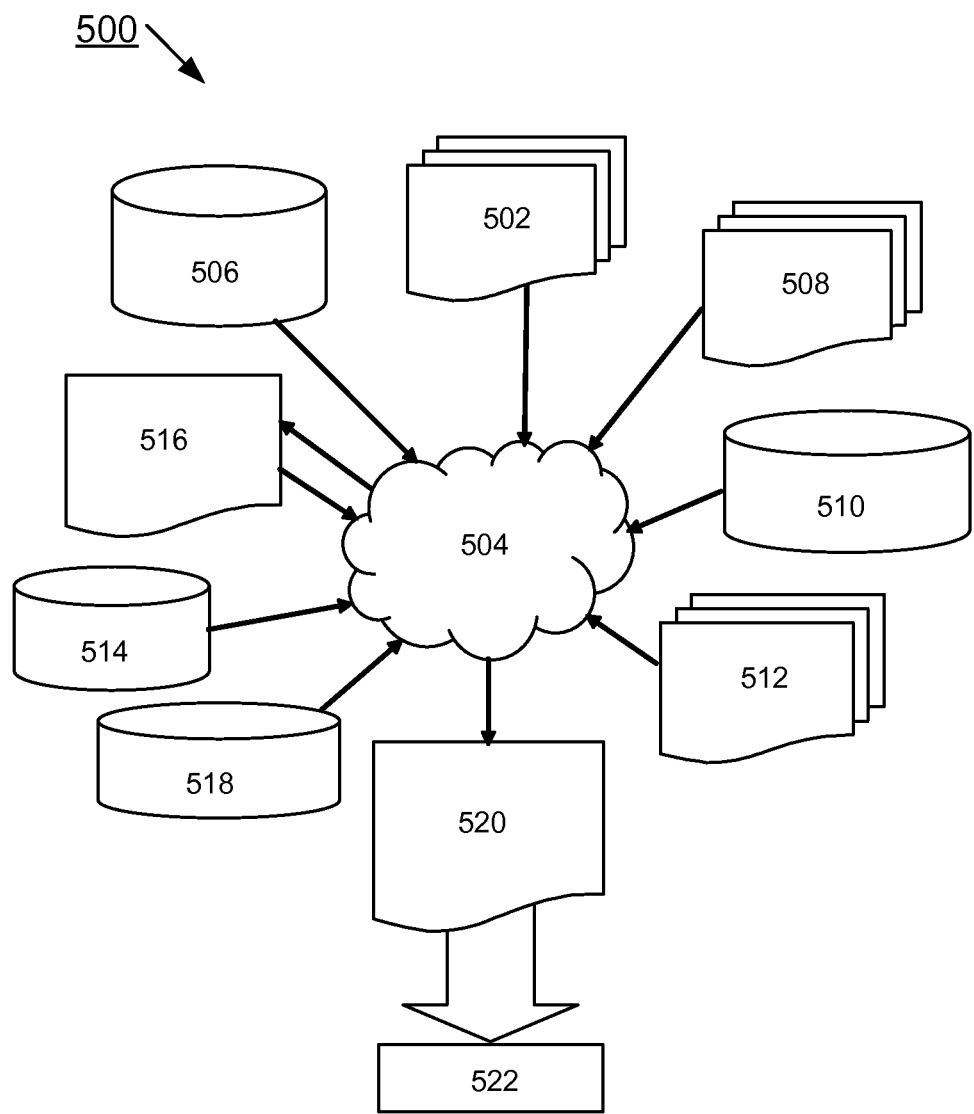
FIG. 5 is a flow diagram of a design process used in semiconductor design, manufacturing, and/or test.

FIG. 5 shows a block diagram of an example design flow 600 that may be used for circuit 200 and the interconnect chip 102 described herein. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 102, 200 in the form of schematics or HDL, a hardware-description language, for example, Verilog, VHDL, C, and the like. Design structure 502 may be contained on one or more machine readable medium. For example, design structure 502 may be a text file or a graphical representation of circuits 102, 200. Design process 504 preferably synthesizes, or translates, circuits 102, 20 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuits.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1A-1E, and 2-4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, and 2-4. Design structure 520 may then proceed to a stage 522 where, for example, design structure 520 proceeds to tapeout, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing a network manager quarantine mode in an interconnect system, said method comprising:

providing a plurality of paths defined by links connected between each source interconnect chip and each destination interconnect chip;

providing each said interconnect chip with a network manager, said network manager sending end-to-end (ETE) heartbeats on said plurality of paths through the interconnect system to each destination interconnect chip;

each said network manager maintaining a heartbeat table with a respective counter to track path status of each path through the interconnect system to each destination interconnect chip; each path being identified by a chip-identification (ID), exit port; said heartbeat table including a respective up/down counter for each chip-ID, exit port, each said up/down counter for each chip-ID, exit port being incremented with a heartbeat being received for said chip-ID, and each said up/down counter for each chip-ID, exit port being decremented on a set interval; first predefined counter values of each said up/down counter for each chip-ID, exit port represent a bad heartbeat and second first predefined counter values of each said up/down counter for each chip-ID, exit port represent a good heart beat; said heartbeat table including an heartbeat return bit from a last heartbeat received, a hop count indicating a hop count of said last heartbeat received; and an enable bit to control sending or not sending heartbeats;

said network manager of a first interconnect chip detecting a path status change from at least one valid path to no working paths for a second interconnect chip; and said network manager of the first interconnect chip, responsive to said detected path status change to no working paths for said second interconnect chip, establishing a quarantine mode for a programmable quarantine time interval to prevent advertising good heartbeats for each of said paths for said second interconnect chip during said programmable quarantine time interval;

said network manager of the first interconnect chip, responsive to said programmable quarantine time interval expiring, advertising good heartbeats for each of said paths for said second interconnect chip, and sending path update responsive to said paths for said second interconnect chip being indicated as good; and wherein each said network manager maintaining said heartbeat table with said respective counter to track status of each path through the interconnect system to each destination interconnect chip includes providing said respective up/down counter with a predefined multiple-bit counter, where a first count range represents said bad heartbeat and a second count range represents said good heartbeat, said second count range being greater than said first count range.

2. The method as recited in claim 1 includes said network manager on said second interconnect chip declaring all paths lost to said first interconnect chip during the quarantine time interval responsive to the quarantine mode of the first network manager.

3. The method as recited in claim 1 wherein providing said respective up/down counter with said predefined multiple-bit counter includes providing a 7-bit counter, where counts 0-63 represent said bad heartbeat, and counts 64-127 represent said good heartbeat.

4. The method as recited in claim 3 includes responsive to said programmable quarantine time interval expiring, and sending a path update responsive to said paths for said second interconnect chip being indicated as good includes allowing each of said paths to be declared working responsive to being validated by both said network manager of the first interconnect chip and said network manager on said second interconnect chip chips.

5. The method as recited in claim 3 includes transmitting a heartbeat at a higher rate than said set decrement rate of said respective up/down counter for each said path.

6. The method as recited in claim 3 includes identifying a path status change, and broadcasting a path status update to each transport layer of said interconnect chip of said network manager.

7. The method as recited in 3 includes identifying a good path responsive to a predefined count value of said respective up/down counter for said path.

8. The method as recited in claim 3 includes identifying a bad path responsive to a predefined count value of said respective up/down counter for said path.

9. The method as recited in claim 3 includes providing predefined fields with said respective up/down counter for each said path, said predefined fields including said heartbeat return bit from said last heartbeat received.

10. The method as recited in claim 3 includes providing predefined fields with said respective up/down counter for each said path, said predefined fields including said hop count indicating a hop count of said last heartbeat received.

11. The method as recited in claim 3 includes providing predefined fields with said respective up/down counter for each said path, said predefined fields including said enable bit to control sending or not sending heartbeats.

12. A circuit for implementing a network manager quarantine mode in an interconnect system, said circuit comprising:

an interconnect chip including a network manager, said network manager sending end-to-end (ETE) heartbeats on a plurality of paths through the interconnect system to each destination interconnect chip; said plurality of paths defined by links connected between said interconnect chip and each said destination interconnect chip;

each said network manager maintaining a heartbeat table with a respective counter to track path status of each said path through the interconnect system to each destination interconnect chip; each path being identified by a chip-identification (ID), exit port; said heartbeat table including a respective up/down counter for each chip-ID, exit port, each said up/down counter for each chip-ID, exit port being incremented with a heartbeat being received for said chip-ID, and each said up/down counter for each chip-ID, exit port being decremented on a set interval; first predefined counter values of each said up/down counter for each chip-ID, exit port represent a bad heartbeat and second first predefined counter values of each said up/down counter for each chip-ID, exit port represent a good heart beat; said heartbeat table including an heartbeat return bit from a last heartbeat received, a hop count indicating a hop count of said last heartbeat received; and an enable bit to control sending or not sending heartbeats;

said network manager of a first interconnect chip detecting a path status change from at least one valid path to no working paths to a second interconnect chip; and said network manager of the first interconnect chip, responsive to said detected path status change to no working paths to said second interconnect chip, establishing a quarantine mode for a programmable quarantine time interval to prevent advertising good heartbeats for each of said paths for said second interconnect chip during said programmable quarantine time interval;

said network manager of the first interconnect chip, responsive to said programmable quarantine time interval expiring, advertising good heartbeats for each of said paths for said second interconnect chip, and sending a path update responsive to said paths for said second interconnect chip being indicated as good; and wherein each said network manager maintaining said heartbeat table with said respective counter to track status of each path through the interconnect system to each destination interconnect chip includes providing said respective up/down counter with a predefined multiple-bit counter, where a first count range represents said bad heartbeat and a second count range represents said good heartbeat, said second count range being greater than said first count range.

13. The circuit as recited in claim 12 includes said network manager on said second interconnect chip declares all paths lost to said first interconnect chip during the quarantine time interval responsive to the quarantine mode established by said network manager of said first interconnect chip.

14. The circuit as recited in claim 12 wherein said predefined multiple-bit counter includes a 7-bit counter, where counts 0-63 represent said bad heartbeat, and counts 64-127 represent said good heartbeat.

15. The circuit as recited in claim 12 wherein said network manager transmits a heartbeat at a higher rate than said set decrement rate of said respective up/down counter for each said path.

16. The circuit as recited in claim 12 wherein said heartbeat table includes predefined fields provided with said respective up/down counter for each said path, said predefined fields including said heartbeat return bit from said last heartbeat received.

17. The circuit as recited in claim 12 wherein said heartbeat table includes predefined fields provided with said respective up/down counter for each said path, said predefined fields including said hop count indicating a hop count of said last heartbeat received.

18. The circuit as recited in claim 12 wherein said network manager responsive to said programmable quarantine time interval expiring, and sending a path update responsive to said paths for said second interconnect chip being indicated as good includes allowing each of said paths to be declared working responsive to being validated by both said network manager of the first interconnect chip and said network manager on said second interconnect chip.

19. A multiple-path local rack interconnect system comprising:
a plurality of interconnect chips including a source interconnect chip and a destination interconnect chip;
a plurality of paths defined by serial links connected between each of said plurality of interconnect chips;
said interconnect chips including a network manager, said network manager sending end-to-end (ETE) heartbeats on a plurality of paths through the interconnect system to each destination interconnect chip; said plurality of paths defined by links connected between said interconnect chip and each said destination interconnect chip;
each said network manager maintaining a heartbeat table with a respective counter to track path status of each said path through the interconnect system to each destination interconnect chip; each path being identified by a chip-identification (ID), exit port; said heartbeat table including a respective up/down counter for each chip-ID, exit port, each said up/down counter for each chip-ID, exit port being incremented with a heartbeat being received for said chip-ID, and each said up/down counter for each chip-ID, exit port being decremented on a set interval; first predefined counter values of each said up/down counter for each chip-ID, exit port represent a bad heartbeat and second first predefined counter values of each said up/down counter for each chip-ID, exit port represent a good heart beat; said heartbeat table including an heartbeat return bit from a last heartbeat received, a hop count indicating a hop count of said last heartbeat received; and an enable bit to control sending or not sending heartbeats;
said network manager of a first interconnect chip detecting a path status change from at least one valid path to no working paths to a second interconnect chip; and
said network manager of the first interconnect chip, responsive to said detected path status change to no working paths to said second interconnect chip, establishing a quarantine mode for a programmable quarantine time interval to prevent advertising good heartbeats for each of said paths for said second interconnect chip during said programmable during said quarantine time interval;
said network manager of the first interconnect chip, responsive to said programmable quarantine time interval expiring, advertising good heartbeats for each of said paths for said second interconnect chip, and sending path update responsive to said paths for said second interconnect chip being indicated as good; and
wherein each said network manager maintaining said heartbeat table with said respective counter to track status of each path through the interconnect system to each destination interconnect chip includes providing said respective up/down counter with a predefined multiple-bit counter, where a first count range represents said bad heartbeat and a second count range represents said good heartbeat, said second count range being greater than said first count range.

20. The multiple-path local rack interconnect system as recited in claim 19 wherein said network manager on said second interconnect chip declares all paths lost to said first interconnect chip during the quarantine time interval responsive to the quarantine mode established by said network manager of said first interconnect chip.

21. A design structure embodied in a non-transitory machine readable medium used in a design process, the design structure comprising:
a circuit tangibly embodied in the non-transitory machine readable medium used in the design process, said circuit for implementing a network manager quarantine mode in an interconnect system, said circuit comprising:
an interconnect chip including a network manager, said network manager sending end-to-end (ETE) heartbeats on a plurality of paths through the interconnect system to each destination interconnect chip; said plurality of paths defined by links connected between said interconnect chip and each said destination interconnect chip;
each said network manager maintaining a heartbeat table with a respective counter to track path status of each said path through the interconnect system to each destination interconnect chip; each said path being identified by a chip-identification (ID), exit port; said heartbeat table including a respective up/down counter for each chip-ID, exit port, each said up/down counter for each chip-ID, exit port being incremented with a heartbeat being received for said chip-ID, and each said up/down counter for each chip-ID, exit port being decremented on a set interval; first predefined counter values of each said up/down counter for each chip-ID, exit port represent a bad heartbeat and second first predefined counter values of each said up/down counter for each chip-ID, exit port represent a good heart beat; said heartbeat table including an heartbeat return bit from a last heartbeat received, a hop count indicating a hop count of said last heartbeat received; and an enable bit to control sending or not sending heartbeats;
said network manager of a first interconnect chip detecting a path status change from at least one valid path to no working paths to a second interconnect chip; and
said network manager of the first interconnect chip, responsive to said detected path status change to no working paths to said second interconnect chip, establishing a quarantine mode for a programmable quarantine time interval to prevent advertising good heartbeats for each of said paths for said second interconnect chip during said programmable during said quarantine time interval;
said network manager of the first interconnect chip, responsive to said programmable quarantine time interval expiring, advertising good heartbeats for each of said paths for said second interconnect chip, and sending path update responsive to said paths for said second interconnect chip being indicated as good, wherein the design structure, when read and used in a manufacture of a semiconductor chip produces a chip comprising said circuit; and wherein each said network manager maintaining said heartbeat table with said respective counter to track status of each path through the interconnect system to each destination interconnect chip includes providing said respective up/down counter with a predefined multiple-bit counter, where a first count range represents said bad heartbeat and a second count range represents said good heartbeat, said second count range being greater than said first count range.

22. The design structure of claim 21, wherein the design structure comprises a netlist, which describes said circuit.

23. The design structure of claim 21, wherein the design structure resides on storage medium as a data format used for the exchange of layout data of integrated circuits.

24. The design structure of claim 21, wherein the design structure includes at least one of test data files, characterization data, verification data, or design specifications.

* * * * *